(12) United States Patent
Craig et al.

(10) Patent No.: US 6,193,612 B1
(45) Date of Patent: Feb. 27, 2001

(54) COLLAPSIBLE DRIVESHAFT

(75) Inventors: Al Benton Craig, Troy; Subash Kumar Mahendru, Rochester; Walter Joseph Golembiewski, Ray; Timothy Peter Raleigh, Macomb Township, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/131,353

(22) Filed: Aug. 10, 1998

(51) Int. Cl.[7] ....................................................... F16C 3/03
(52) U.S. Cl. ........................... 464/162; 464/183; 180/337; 188/374
(58) Field of Search ..................................... 464/162, 158, 464/183; 248/569, 636; 188/371, 374; 180/337; 301/128, 130; 403/2, 359.4

(56) References Cited

U.S. PATENT DOCUMENTS

| | | |
|---|---|---|
| 1,644,800 | 10/1927 | Urschel . |
| 1,657,291 | 1/1928 | Weiland . |
| 2,142,570 * | 1/1939 | Martin ................................... 248/569 |
| 2,161,138 * | 6/1939 | Cutting ................................. 464/183 |
| 2,695,504 | 11/1954 | Magee . |
| 2,696,089 | 12/1954 | Heth . |
| 2,706,125 | 4/1955 | Morley . |
| 2,761,299 | 9/1956 | Huddle . |
| 3,577,746 | 5/1971 | Dolan . |
| 4,125,000 * | 11/1978 | Grob .............................. 403/359.2 X |
| 4,181,198 * | 1/1980 | Lindberg ............................... 188/371 |
| 4,460,182 | 7/1984 | Brissette . |
| 5,104,136 * | 4/1992 | Buhl et al. ........................ 188/371 X |
| 5,222,915 | 6/1993 | Petrzelka et al. . |
| 5,464,251 * | 11/1995 | Castellon .......................... 188/371 X |
| 5,575,501 * | 11/1996 | Moriyama et al. .............. 188/371 X |
| 5,580,314 | 12/1996 | Moriyama et al. . |
| 5,716,276 * | 2/1998 | Mangas et al. ................... 464/162 X |

* cited by examiner

Primary Examiner—Lynne H. Browne
Assistant Examiner—Greg Binda
(74) Attorney, Agent, or Firm—Frank G. McKenzie

(57) ABSTRACT

A driveshaft assembly includes a male shaft and a female shaft slidably engaged with the male shaft. The shafts absorb energy during axial deformation of the driveshaft while substantially maintaining radial alignment of the male and female shafts.

7 Claims, 2 Drawing Sheets

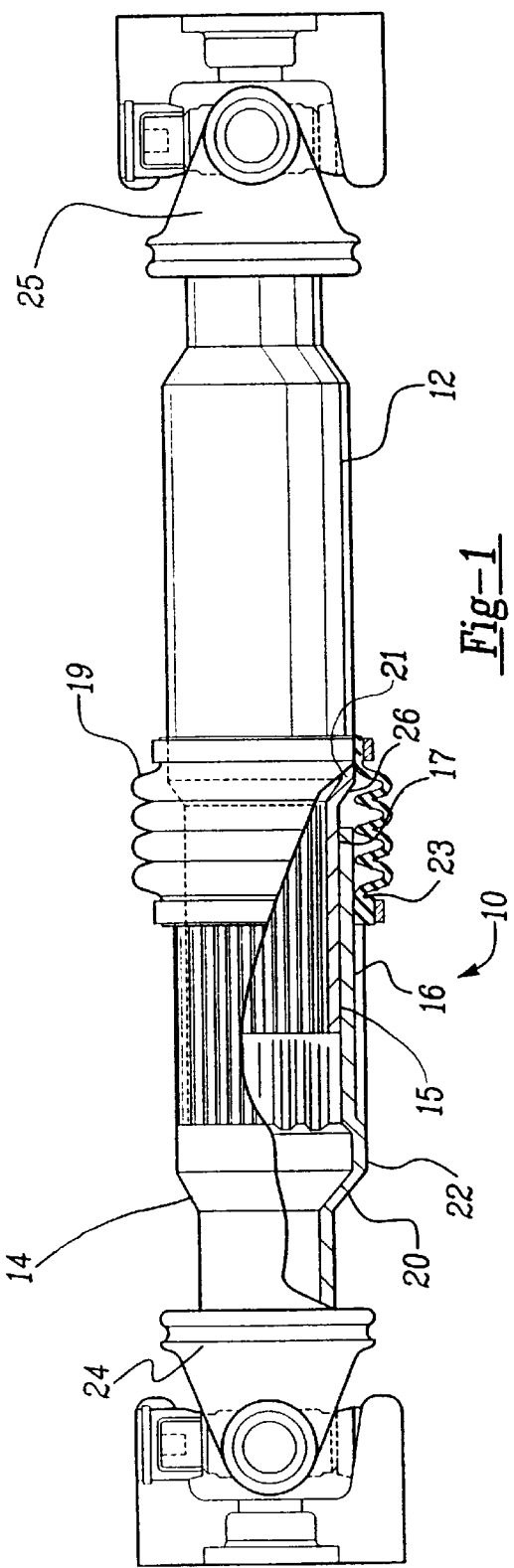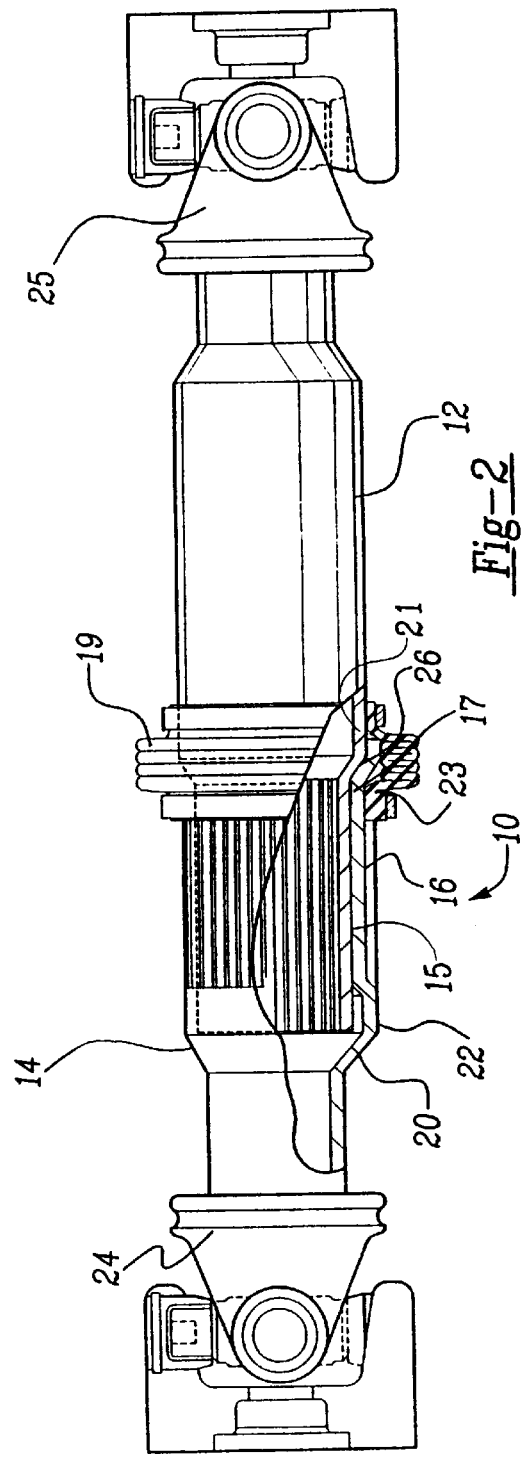

COLLAPSIBLE DRIVESHAFT

FIELD OF THE INVENTION

The present invention relates to a driveshaft for a motor vehicle and more particularly to a telescoping driveshaft having an energy absorption feature.

DESCRIPTION OF THE PRIOR ART

In a rear wheel drive motor vehicle, a driveshaft transmits torque from the transmission through a differential to the rear wheels of the motor vehicle. During a frontal crash, energy is imparted upon the vehicle and deforms the components in a longitudinal manner. Typically, the engine and transmission are driven rearward in a frontal crash, causing the driveshaft to buckle during such an impact. This is likely to cause extensive damage to adjacent underbody components.

U.S. Pat. No. 5,580,314 describes an energy-absorbing intermediate shaft for a steering column. With a column as described in the '314 patent, a portion of the intermediate shaft is reduced to more predictably buckle during a crash and thereby absorb energy during a crash. However, the radial excursion of this design while the shaft buckles may cause damage to adjacent components, and therefore may require a large amount of clearance around the shaft to function properly.

It would be desirable to provide a telescoping shaft with better energy absorption characteristics and one which provides improved longitudinal deformation during a crash.

SUMMARY OF THE INVENTION

It is thus an object of the present invention to provide a driveshaft which axially collapses during a crash and absorbs energy while remaining substantially axially aligned.

A driveshaft assembly according to the present invention includes a male shaft having an outer surface and a female shaft slidably engaged with the male shaft. The shafts absorb energy during axial deformation of the driveshaft while maintaining alignment of the male and female shafts.

BRIEF DESCRIPTION OF THE DRAWINGS

FIG. 1 is a partial sectional side view of a driveshaft according to the present invention.

FIG. 2 is the driveshaft of FIG. 1 after compression.

DETAILED DESCRIPTION OF THE PREFERRED EMBODIMENTS

Figure 3:
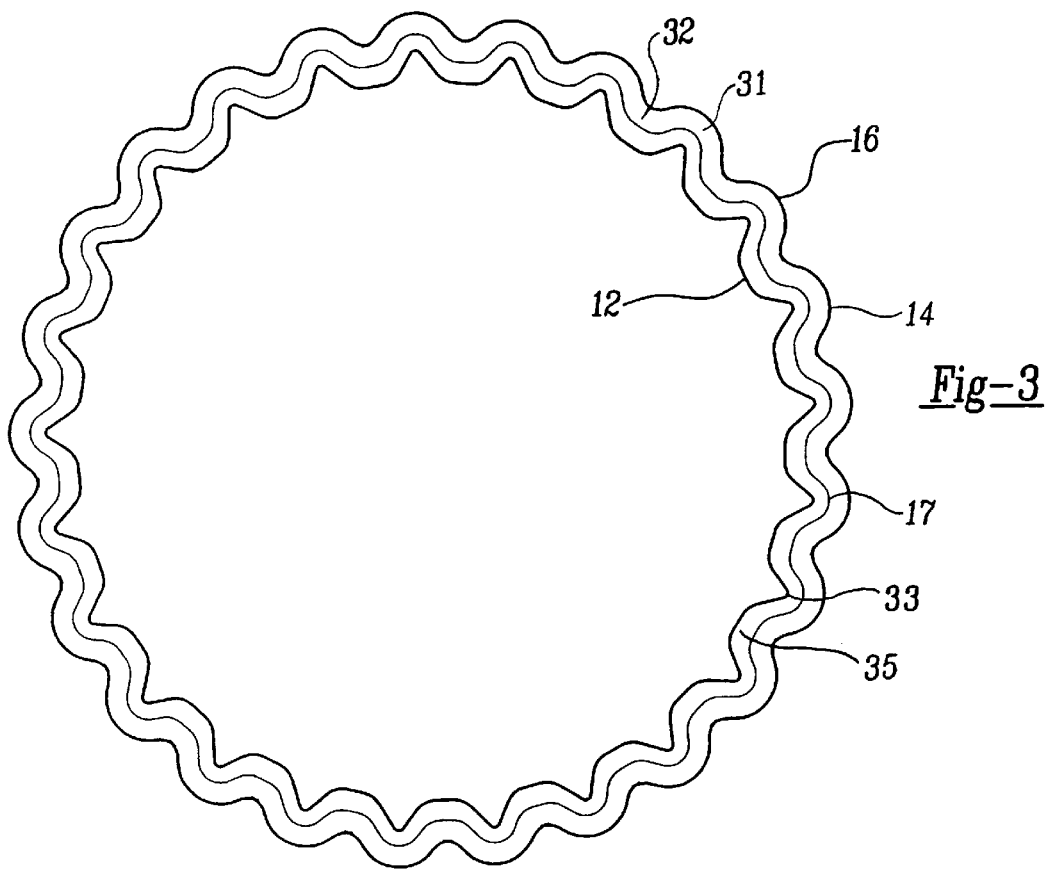
FIG. 3 is a rear sectional view through the driveshaft of FIG. 1.

Referring first to FIG. 1, a driveshaft assembly 10 according to the present invention is provided. The driveshaft assembly 10 is illustrated in a position prior to a crash, that is, the driveshaft assembly 10 has not been collapsed. FIG. 2 illustrates the driveshaft assembly 10 after collapse.

The driveshaft assembly 10 rotates about an axis to transmit torque in a known manner. A male member 12 is rotatably drivably engaged with a female member 14 through a splined connection 15. Accordingly, the female member 14 includes an internally splined portion 16 slidably engaged with an externally splined portion 17 of the male member 12. The internally splined portion 16 extends for a first length from the rear end of the female member 14. Likewise, the splined portion 17 of the male member 12 extends for a length at the front end thereof. A transition 20, 26 is formed between the splined 16, 17 and unsplined portions 22, 21 of the female and male members 14, 12.

While the vehicle is driven, the male member 12 moves axially with respect to the female member 14 through the splined connection 15. During a crash with a longitudinal component, the female member 14 is urged axially rearwardly over the male member 12. While the female member 14 thus moves rearwardly, and the internally splined portion 16 is forced beyond the externally splined portion 17, the internally splined portion 16 engages the transition 26 and the unsplined portion 21 of the male member 12.

Figure 4:
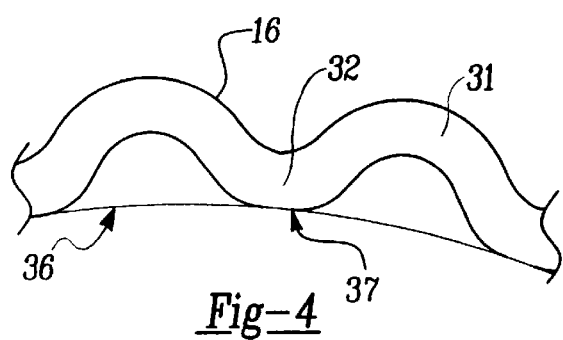
FIGS. 4 and 5 are partial sectional views of the female and male shafts of FIG. 3.
Figure 5:
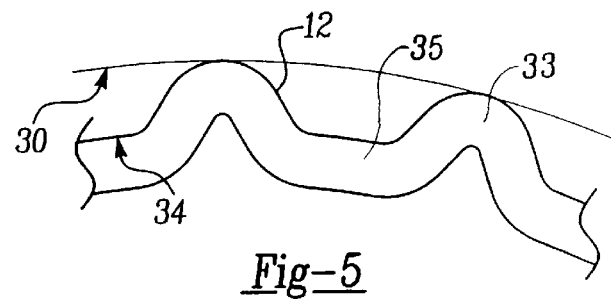

As illustrated in FIGS. 3–5, the splined portion 16 of the female member 14 comprises circumferentially spaced outwardly and inwardly projecting splines 31, 32 formed as a circumferentially convoluted wall in the female member 14. The front portion of the male member 12 likewise includes a splined portion 17 with mating outwardly and inwardly projecting splines 33, 35, formed as a circumferentially convoluted wall in the male member 12.

In a preferred embodiment, each of the male and female members 12, 14 are formed from cylindrical tubes, the male tube fitting inside of the female tube. The splined portions 16, 17 are preferably cold formed in each of the tubes using a Grob process, which is well known to one skilled in the art. The Grob process cold thus forms the convoluted walls. The outwardly projecting splines 31 and 33 form an outer diameter 37, 30, respectively, which is approximately equal to the respective outside diameter of the tubes before the internally projecting splines 32 and 35 are formed in the members 14, 12. The number of splines 31, 32, 33, 35 and depth thereof is application specific to ensure the driveshaft assembly 10 is capable of transmitting the torque for the particular application. In an exemplary preferred embodiment, the depth of the splines is approximately 0.2 inch and 26 externally projecting splines 31, 33 are provided in each member 14, 12. The depth is defined as the distance from the top of a spline (indicated, for example, at the minor diameter of the male tube 12 at 34) to the outside, or major diameter, (indicated at 30 for the male tube 12) of an outwardly projecting spline 33.

The female member 14 is preferably swaged forward of the unsplined portion 22. The forward end of the female member 14 is thus reduced to a size which fits a standard weld yoke 24 for attachment to a universal joint as is well known to one skilled in the art. The rear end of the male member 12 is preferably likewise swaged to reduce the diameter thereof to fit an identical weld yoke 25, as is known to one skilled in the art.

The splined portion 16 of the female member 14 has an inside, or minor, diameter 36 at the base of the internal splines 32. The inside diameter 36 is smaller than the outside diameter of the transition 26 and unsplined portion 21 of the male member 12. As the female member 14 is urged rearwardly, the interference therebetween causes the female member 14 to plastically deform and expand radially outwardly as illustrated in FIG. 2. This expansion requires a large amount of energy due to the cold working of the female member 14 and thus absorbs a portion of the crash energy. Because the driveshaft assembly 10 is thereby permitted to collapse axially and does not buckle significantly, the vehicle may be in a condition to permit towing or driving of a damaged vehicle which would have otherwise required a trailer to transport the vehicle to a repair facility. More significantly, because the driveshaft assembly 10 does not buckle, adjacent components remain undamaged after a crash and therefore the damage to the vehicle is reduced.

The female member 14 includes an unsplined portion 22 forward of the splined portion 16. The unsplined portion 22 preferably has an inside diameter larger than the outside diameter 30 of the splines of the male member 12. Thus, during axial compression of the driveline assembly 10 as described above, the male member 12 moves freely within the unsplined portion 22, as long as the male member 12 is not forced beyond the unsplined portion 22. Preferably the female member 14 in front of the splined portion 16 has an axial length that is adequate to prevent the male member 12 from contacting the weld yoke 24 of the female member 14 during most crashes.

In an alternative embodiment, the unsplined portion 22 of the female member 14 has a diameter slightly less than the outside diameter 30 of the outwardly projecting male splines 33, thus causing a second interference during a crash, and therefore causing radial expansion of the female member 14 at the unsplined portion 22, or radial compression of the male splined portion 17. Such expansion or compression occurs in a manner similar to that described above, to absorb additional crash energy. In such an alternative embodiment, this interference may enable a reduction of the amount of interference between the splined and unsplined portions of male and female members 12 and 14. In this embodiment, the outwardly projecting splines 31 of the female member 14 have a smaller inside diameter than the outside, or major diameter 30, of the external splines 33 of the male member 12. Alternatively, the inwardly projecting splines 32 of the female member 14 have a greater depth (smaller inside diameter 36) than the minor diameter 34 of the splines 35 of the male member 12.

In a further alternative embodiment, during the axial compression of the driveshaft assembly 10, the male member 12 is also radially compressed when the splined portion 17 engages the transition 20 and unsplined portion 22 of the female member 14, likewise absorbing some of the crash energy as described above. The expansion of the female member 14 and compression of the male member 12 occurs due to interferences as described in the preceding paragraphs, but the members 12, 14 are modified to enable such compression of the male member 12. One skilled in the art appreciates that in such an alternative embodiment, the modifications may include providing a thin wall section in the male member 12 or removing material from the male member 12 in the forward portion thereof, such as by providing axial slots, to facilitate compression thereof.

In a preferred embodiment, a boot seal 19 is provided to cover the splined connection 15 between the male and female members 12, 14, in part to keep contaminants out of the splined connection 15. The boot seal 19 is clamped at each end thereof to the outside diameters of the members 12, 14 in a known manner. In a preferred embodiment, the boot seal 19 includes a splined inside diameter 23 corresponding with the splined portion of the female member 14 and mates with the splines thereof. The boot 19 engages a smooth cylindrical surface of the male member 12 in a conventional manner. Although not illustrated, one skilled in the art appreciates the boot seal 19 may likewise engage splines on a male member 12 or a smooth surface of a female member 14. During a crash, the members 12, 14 are axially compressed and the boot seal is forced to slide along the outer surface of the male member 12, thereby absorbing additional energy.

One skilled in the art appreciates that the diameters of the male and female member 12 and 14 may vary depending on the vehicle application and materials used. However, in common applications, the outside diameter of a male shaft may range between 2.5 to 4.0 inches where the shafts are preferably formed from a low carbon alloy steel, such as 1015 or 1026 steel. In such a preferred embodiment, the shafts have a wall thickness of approximately 0.065 inches. A preferred clearance between the male and female splines is approximately 0.03 inches on the diameter to facilitate axial movement therebetween. In a preferred embodiment, the interference of the unsplined portion 21 of the male member into the inwardly projecting splines 32 of the female member is 0.4 inches on the diameter. One skilled in the art recognizes this interference is application specific, that is, dependent upon the energy dissipated, the materials selected, the size of the members, etc. One skilled in the art also recognizes the material and thickness are application specific and other materials, such as aluminum, steel alloys, or composite shafts, may be used as may be desirable, based on weight, size, power, and other parameters. In a preferred embodiment, these parameters are selected to create an assembly which expands the female shaft 14 with a force less than 20,000 lbs.

In an alternative embodiment (not shown), each the male and female members 12 and 14 have splines formed on the walls of tubes in a more traditional known manner, such as forging or broaching. The radial deformations of the female tube described above occurs due to careful design of the tube cross section thicknessess to enable radial expansion of the female member adjacent the splines. This may require machining of the outside diameter of the female member to reduce the thickness and therefore the radial strength thereof during such a crash. Alternatively, other means may be used to weaken the female member thereat, such as by cutting axial slots in the female member to facilitate the radial expansion. Similar measures may be taken on the male member to facilitate radial compression thereof.

In a further alternative embodiment (not shown), the splines extend along the entire length of the male and female members, and therefore the transition from the splines to the unsplined portion as described above and illustrated in the figures is not provided. The female member has a reduced portion which engages the forward end of the splines of the male member during compression of the driveshaft. This reduced portion comprises a circumferentially formed depression rolled into the outwardly projecting splines (the female tube is essentially an annular tube in this region having an inside diameter providing the 0.4 inch interference described above). During a crash, the male member thus engages the depression, and the forward end of the male member causes expansion of the reduced portion, or the male member is compressed within the reduced portion of the female member in a manner similar to that described above.

In a further alternative embodiment, the splines likewise extend along the entire length of both the male and female members. The interference described above for expanding the female member is created by outwardly deforming the splines of the male member. In such an embodiment, each of the splines is filled with a material (such as by welding a filler in place between each spline), or integrally forming projections in the tube between splines. In one embodiment, male tube is formed from a flat sheet of metal. The projections are formed by pressing alternating longitudinal depressions in the flat sheet of sheet metal and rolling the sheet into a cylinder and welding the seam. In this embodiment, the longitudinal depressions (the splines) have a break formed therein and therefore a transition is formed therein to cause the interference described above. These projections may alternatively be formed by any other known manner, including swaging (a female tube), extrusion, hydroforming, or any known technique.

In a further alternative embodiment (not shown), the transition 26 comprises an circumferential projection (or series of axially spaced projections) formed in the male tube, as opposed to the cylindrical unsplined portion 21 shown in FIGS. 1 and 2. This circumferential projection likewise comprises a larger outside diameter in the male member (between the splines) so the female member deforms outwardly during a crash, thereby dissipating some crash energy. Alternatively, the outward projections are deformed inwardly by the splines of the female member during a crash.

In another alternative embodiment, the driveshaft assembly 10 illustrated in FIGS. 1 and 2 includes a male tube 12 having a closed front end (not shown) engaged with the female tube 14. The female tube 14 has a closed end at the weld yoke 24. In this embodiment, during the crash, the air within the cavity 27 defined by the closed end of the male tube and the inside of the female tube is compressed, absorbing a further amount of energy. Likewise, the female cavity may be filled with another compressible medium, such as a fluid, gas, or resilient material, such as rubber, or a frangible material, such as a carbon graphite tube, and thereby absorb additional energy.

One skilled in the art recognizes the driveshaft may comprise other shapes, such as square, or any other slidably engaged geometry of axially slidably engaged shafts, one of the members having a section which interferes with the other member to absorb energy yet allowing collapse of the shaft during a crash. In such an embodiment, the noncircular shape transmits torque in a known manner and therefore splines are not required.

The forms of the invention shown and described herein constitute the preferred embodiments of the invention; they are not intended to illustrate all possible forms thereof. The words used are words of description rather than of limitation, and various changes may be made from that which is described here without departing from the spirit and scope of the invention.

What is claimed is:

1. A driveshaft assembly rotatable about an axis, comprising:

a male shaft having an outer surface;

a female shaft slidably engaged with the outer surface of the male shaft, the male shaft and the female shaft each being a cylindrical tube having a circumferentially convoluted wall forming a splined connection therebetween;

means for absorbing energy during axial deformation of the driveshaft assembly while substantially maintaining radial alignment of the male and female shafts; and a boot seal disposed over the male and female shafts and covering the splined connection for axial compression and additional energy absorption.

2. A driveshaft according to claim 1, wherein the means for absorbing energy during axial deformation of the driveshaft comprises:

the male shaft having a plurality of circumferentially spaced longitudinal external splines provided on the outer surface thereof, the external splines having a major diameter;

the female shaft having a first length with a plurality of internal splines having a minor diameter slidably engaged with the external splines on the male tube; and a transition means for engaging one of the internal or external splines to radially deform one of the male and female shaft upon engagement of the transition means with said one of the splines.

3. A driveshaft assembly rotatable about an axis, comprising:

a male shaft having an outer surface with a plurality of external splines projecting therefrom forming a major diameter;

a female shaft having a first internal surface with a plurality of internal splines projecting therefrom slidably engaged with the external splines of the male shaft, the internal splines forming a major diameter and a minor diameter inside the female shaft, the male shaft and the female shaft each being a cylindrical tube having a circumferentially convoluted wall forming a splined connection therebetween;

expansion means for radially deforming one of the shafts during a crash to absorb energy while maintaining alignment of the shafts during axial deformation of the driveshaft assembly; and a boot seal disposed over the male and female shafts and covering the splined connection for axial compression and additional energy absorption.

4. A driveshaft according to claim 3, wherein the expansion means comprises:

the male shaft comprising a tube having a first length with the external splines formed thereon and a transition means having an outside diameter larger than the minor diameter of the internal splines of the female tube.

5. A driveshaft according to claim 3, wherein the expansion means comprises:

the female shaft having an inside diameter; and the male shaft having a first length with a first outside diameter slidably engaged with the female shaft and a second length axially spaced from the female shaft having a second outside diameter greater than the inside diameter of the female shaft.

6. A driveshaft according to claim 5, wherein the female shaft is a one-piece unitary member attached to a stud yoke.

7. A driveshaft according to claim 3, wherein the male and female shafts are one-piece unitary members connected to a respective one of a pair of stud yokes.

* * * * *